(12) United States Patent
Pritchard et al.

(10) Patent No.: US 6,237,926 B1
(45) Date of Patent: May 29, 2001

(54) INDEPENDENT SUSPENSION FOR A VEHICLE

(75) Inventors: Michael Pritchard, Gresham; Robert D. Boydstun, IV, Clackamas, both of OR (US)

(73) Assignee: Boydstun Metal Works, Inc., Portland, OR (US)

( * ) Notice: Subject to any disclaimer, the term of this patent is extended or adjusted under 35 U.S.C. 154(b) by 0 days.

(21) Appl. No.: 09/309,607

(22) Filed: May 11, 1999

(Under 37 CFR 1.47)

(51) Int. Cl.⁷ .................................................. B60G 3/12
(52) U.S. Cl. ........................ 280/124.128; 280/124.157; 280/124.153
(58) Field of Search ..................... 280/124.128, 124.129, 280/124.13, 124.153, 124.134, 124.157, 124.158

(56) References Cited

U.S. PATENT DOCUMENTS

| | | |
|---|---|---|
| 2,597,122 | 5/1952 | Mullen et al. . |
| 3,078,104 | 2/1963 | Chalmers . |
| 3,704,898 | 12/1972 | Schmidt . |
| 3,746,363 | 7/1973 | Borns . |
| 3,822,908 | 7/1974 | Gouirand . |
| 4,248,455 | 2/1981 | Manning . |
| 4,500,112 * | 2/1985 | Raidel ................................. 280/693 |
| 4,763,953 | 8/1988 | Chalin . |
| 4,826,206 | 5/1989 | Immega . |
| 4,878,691 | 11/1989 | Cooper et al. . |
| 4,934,733 | 6/1990 | Smith et al. . |
| 5,016,912 | 5/1991 | Smith et al. . |
| 5,203,585 | 4/1993 | Pierce . |
| 5,275,430 | 1/1994 | Smith . |
| 5,366,237 * | 11/1994 | Dilling et al. ....................... 280/711 |
| 5,505,278 | 4/1996 | Smith . |
| 5,536,036 * | 7/1996 | Ehrlich ................................. 280/711 |

FOREIGN PATENT DOCUMENTS 0 464 412   6/1991   (EP) .

* cited by examiner

Primary Examiner—Paul N. Dickson
Assistant Examiner—Faye M. Fleming
(74) Attorney, Agent, or Firm—Chernoff, Vilhauer, McClung & Stenzel

(57) ABSTRACT

An independent suspension is provided for a vehicle having a floor located between the vehicle's wheels. The independent suspension includes a light weight trailing arm pivotally attached at one end to the vehicle. An air brake actuator is affixed to the trailing arm below the floor of the vehicle. An axle supporting a wheel is cantilevered from the outboard edge of the trailing arm and an air spring is interposed between the trailing arm and the vehicle's body to oppose the force exerted by the axle. The trailing arm has a substantially planar body with a wall extending substantially around the periphery of the body. A thickened section of the body extends over an area of the lower surface of the planar body under the inner portion of the air spring bearing area. The construction of the trailing arm and the widely spaced frame attachment points make possible a suspension system having low unsprung mass but not requiring additional links to the frame for stability.

12 Claims, 4 Drawing Sheets

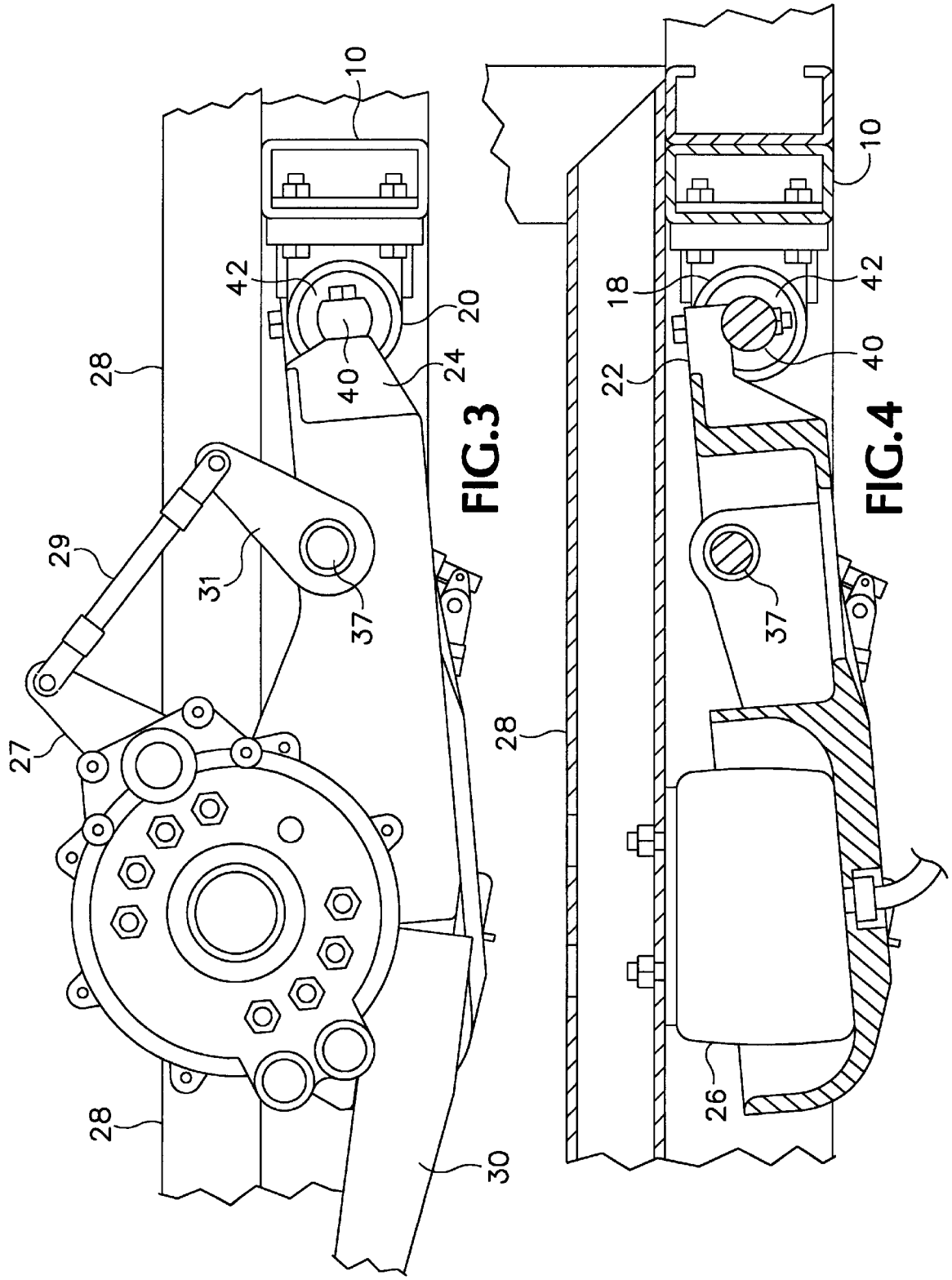

INDEPENDENT SUSPENSION FOR A VEHICLE

BACKGROUND OF THE INVENTION

The present invention relates to vehicle suspensions and more particularly to an independent suspension for a vehicle having a floor which is disposed between the vehicle's wheels.

Lowering the cargo floor of a vehicle maximizes the height of the cargo space for any particular overall vehicle height, lowers the center of mass of the cargo improving vehicle stability, and makes loading easier. However, when the floor is lowered between the wheels, a suspended axle connecting wheels on each side of the vehicle is generally difficult, if not impractical, to achieve. An independent suspension system, connecting the wheels on each side of the vehicle to the vehicle itself, is usually required if the floor of the cargo space is to be located between the wheels at a level near or below the centers of rotation of the wheels. To take the greatest advantage of lowering the floor, the suspension should be compact to minimize the intrusion of the suspension into the cargo space and the height over the wheels should be minimized to permit loads to conveniently overhang the wheels. To improve the responsiveness of the suspension when traveling rough surfaces and to reduce the dynamic forces generated by the moving suspension components it is desirable to minimize the unsprung mass of the suspension system. However, the suspension system must be sufficiently strong to support the weight of the loaded vehicle as it travels over rough surfaces and to resist the forces of braking, rolling resistance, collision with obstacles, and lateral movement of the vehicle.

Smith, U.S. Pat. No. 5,275,430, discloses several independent suspensions for a vehicle with a lowered cargo floor. The suspensions feature a wheel support plate which is rotationally attached at a first end to the vehicle's frame. The wheel is attached to the wheel support plate between the frame attachment and an air spring interposed between the second end of the wheel support plate and the vehicle's frame. The air spring opposes the weight of the vehicle and road forces while providing for vertical motion of the wheel for travel over rough surfaces. Mounting the air spring either behind or above the wheel is disclosed. Protrusion of the suspension into the cargo space is minimized by the "thinness" of the wheel support plate. However, the moments resulting from the cantilevered wheel mounting are reacted through the relatively thin "thickness" of the wheel support plate and at closely spaced frame attachments. As a result, the wheel support plate is large and heavy increasing the unsprung mass and a complex lower link connecting the wheel support plate to the frame is necessary for the lateral stability of the wheel support plate. In addition, locating the air spring and the air brake actuator behind the wheel increases the distance between wheels for vehicles with multiple wheels increasing the force necessary to steer the vehicle and to otherwise control its lateral movement. On the other hand, locating the air spring and brake actuator above the wheel increases the height of the fender area over the wheel interfering with loads which overhang the wheels.

What is desired, therefore, is a rugged, compact independent suspension for a vehicle having a floor disposed between the supporting wheels. A suspension system which does not require additional stabilizing linkages and has a low unsprung mass is desirable.

SUMMARY OF THE INVENTION

According to one preferred aspect of the present invention an independent suspension system for a vehicle includes a trailing arm pivotally attached, at its forward end, to the vehicle at a pivot axis below the floor of the vehicle. An axle is affixed to the trailing arm at a location spaced apart from the forward end of the trailing arm. The axle supports, for rotation, a wheel of the vehicle. A spring is interposed between the vehicle and the trailing arm to oppose the force exerted on the trailing arm by the axle. A brake is attached to the axle and operated by an air brake actuator affixed to the trailing arm below the floor of the vehicle. Mounting the suspension components, including the brake actuator, below the floor provides a compact suspension for close spacing of the wheels of multi-wheel suspensions and minimal intrusion into the cargo space.

According to a separate preferred aspect of the invention, the trailing arm of the suspension has a substantially planar body with an outboard edge extending substantially longitudinally of the vehicle, a forward edge extending substantially transversely to the outboard edge, and an inboard edge extending substantially longitudinally of the vehicle and spaced apart from the outboard peripheral edge. A peripheral wall extends substantially around the periphery of the body. A mid wall extends from the outboard edge to the inboard edge of the trailing arm and, in conjunction with the peripheral wall, forms a spring bearing area on the upper surface of said body. An axle is cantilevered from the peripheral wall at the outboard edge of the body and the trailing arm is connected to the frame at the forward edge of the body. The frame connection permits rotation of the trailing arm in a plane parallel to the longitudinal axis of the vehicle but resists movement of the trailing arm relative to the frame in all other directions. The construction of the trailing arm increases the section of the arm strengthening the arm. This makes feasible manufacture of the arm of a light weight material, such as aluminum, reducing the unsprung mass of the suspension. Reducing the unsprung mass improves the responsiveness of the suspension on rough surfaces and improves control of the vehicle. The lateral rigidity of the trailing arm and frame connections provide lateral stability to the suspension without the need of additional stabilizing linkages.

The foregoing and other objectives, features and advantages of the invention will be more readily understood upon consideration of the following detailed description of the invention, taken in conjunction with the accompanying drawings.

BRIEF DESCRIPTION OF THE DRAWINGS

FIG. 3 is a side elevation of the independent suspension taken along line 3—3 of FIG. 2.

FIG. 4 is a sectional view of the trailing arm of the suspension taken along line 4—4 of FIG. 2.

DETAILED DESCRIPTION OF THE PREFERRED EMBODIMENT

Figure 1:
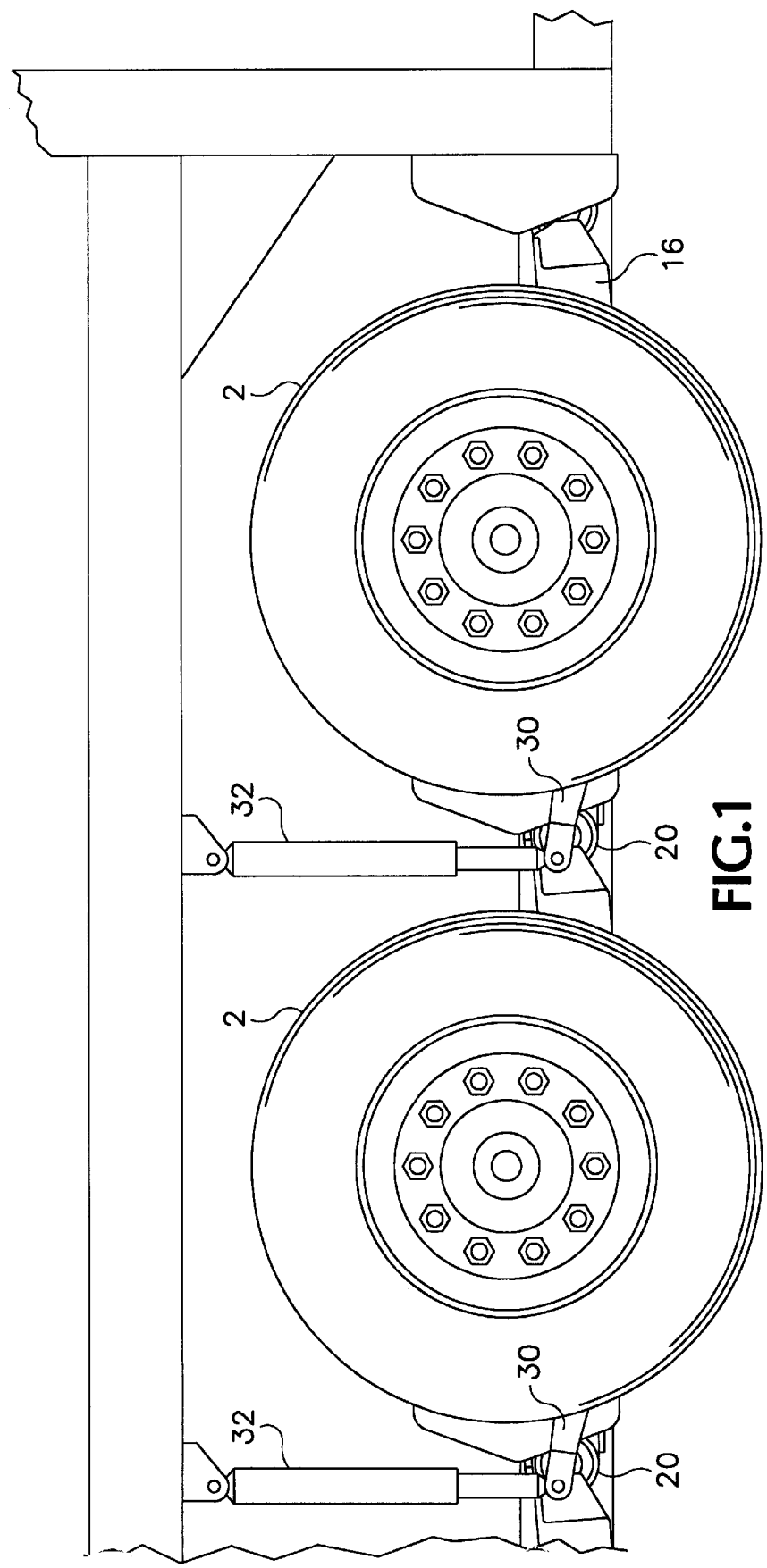
FIG. 1 is a side elevation view illustrating a vehicle incorporating an independent suspension of the present invention.
Figure 2:
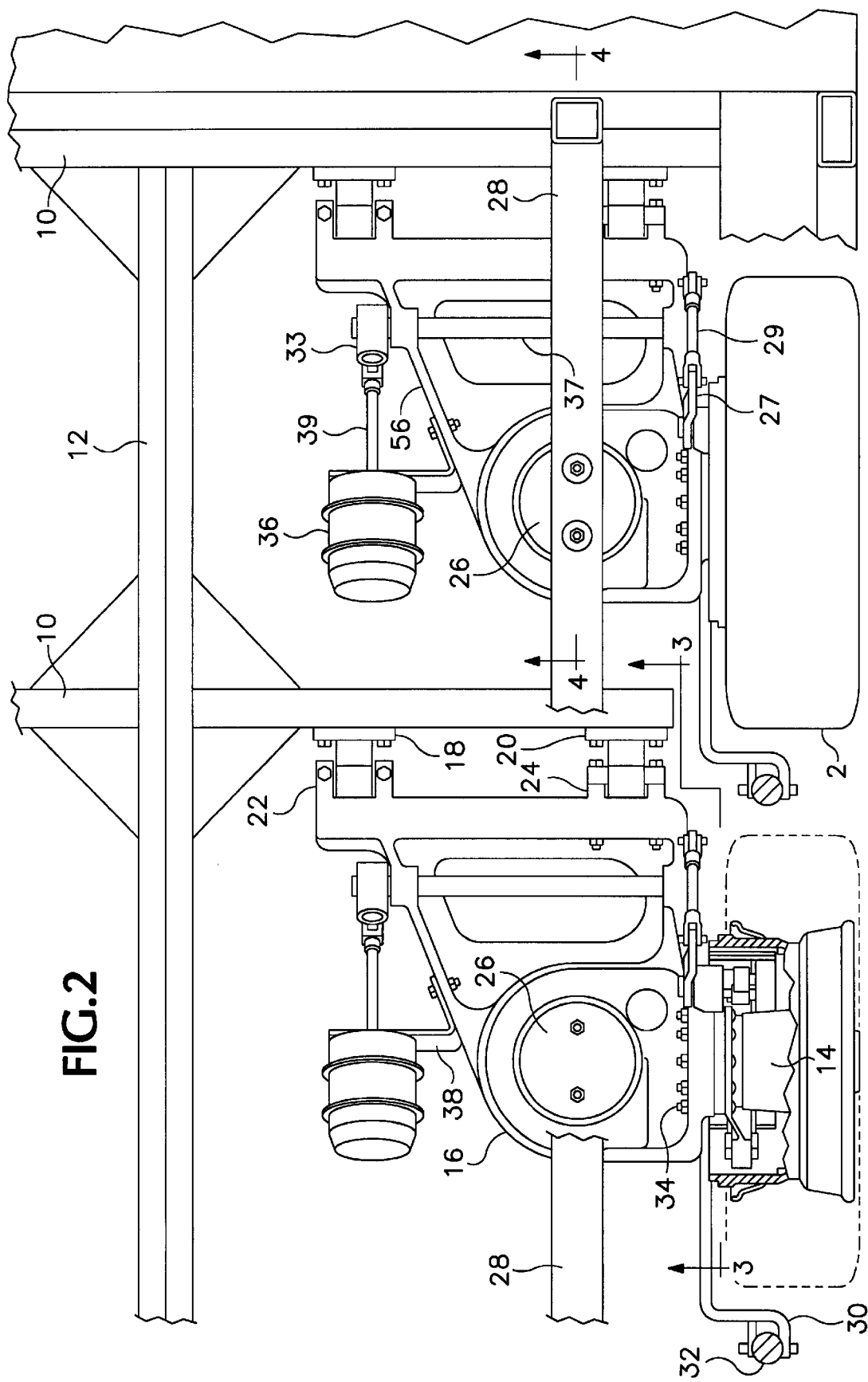
FIG. 2 is a top view of the independent suspension with a partial section through a wheel.

Referring to FIG. 1, a vehicle incorporating the suspension system of the present invention is supported by a plurality of wheels 2 along the outer edge of the vehicle. Referring to FIG. 2, the vehicle incorporates a frame comprising, generally, lateral stringers 10 arranged transversely to the longitudinal axis of the vehicle and longitudinal stringers 12 arranged parallel to the vehicle's longitudinal axis. Each wheel 2 is arranged to rotate about an axis transverse to the longitudinal axis of the vehicle. The floor of the cargo area is supported by the lateral 10 and longitudinal 12 stringers and is disposed between the wheels 2.

The frame of the vehicle is supported on the wheels 2 by the independent suspension of the present invention. Each wheel 2 is mounted for rotation on an axle 14 affixed to a trailing arm 16. The trailing arm 16 is attached at its forward end to a lateral stringer 10 by inboard 18 and outboard 20 elastomer bushed, frame attachments. Referring to FIGS. 3 and 4, the inboard 18 and outboard 20 frame attachments comprise pairs of inboard coupling elements 22 and outboard coupling elements 24 on the trailing arm 16 which are arranged to engage pins 40 which, in turn, engage rubber bushings 42. The frame attachments 18 and 20 permit the trailing arm 16 to pivot in the plane of the longitudinal axis of the vehicle but resist movement of the trailing arm 16 relative to the vehicle in all other directions. The elastomer bushing 42 absorbs vibration and shock at the frame attachments 18 and 20. The weight of the vehicle and road forces, acting at the wheel 2, urge the trailing arm 16 to rotate upward toward the floor beam 28 of the vehicle. An air spring 26 interposed between the trailing arm 16 and the floor beam 28 of the vehicle urges the trailing arm 16 to rotate downward. The compliant air spring 26 opposes the vehicle weight and dynamic road forces while permitting vertical movement of the wheel 2 in response to travel over an uneven surface. The center of rotation of the wheel 2 is located above the top of the air spring 26. A shock absorber mount arm 30 is affixed to the trailing arm 16 and extends rearward and then outboard so that a shock absorber 32 can be mounted aft of the wheel 2. The shock absorber 32 damps suspension system oscillation when traveling over rough surfaces.

Figure 5:
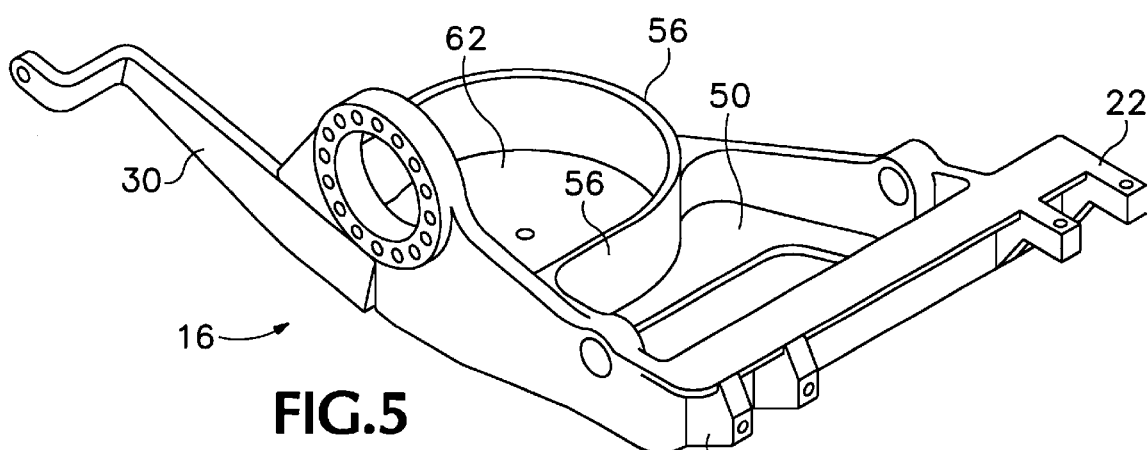
FIG. 5 is perspective view of the trailing arm of the independent suspension.
Figure 6:
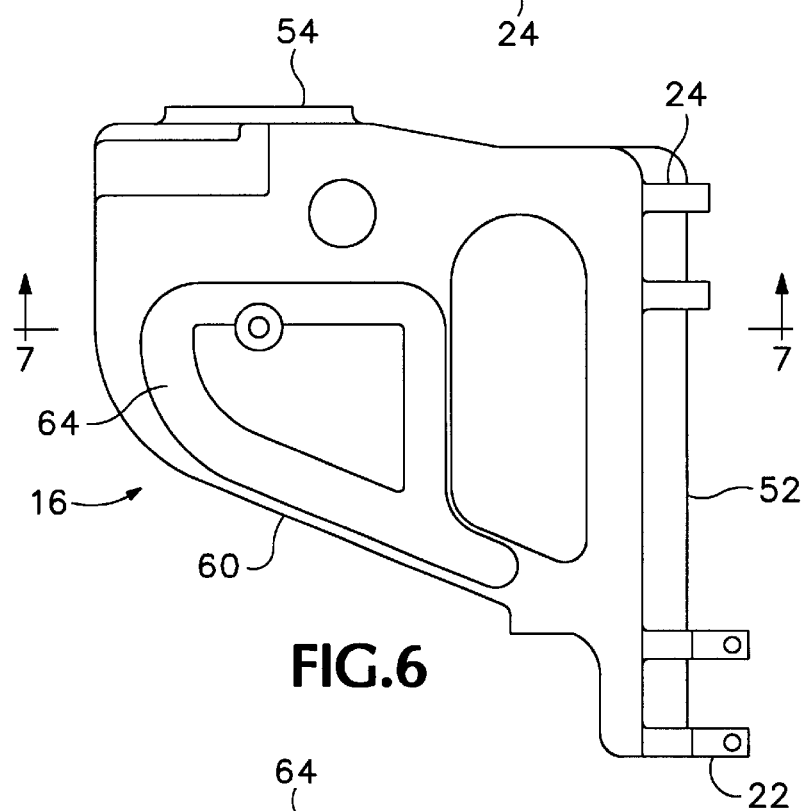
FIG. 6 is bottom view of the trailing arm.
Figure 7:
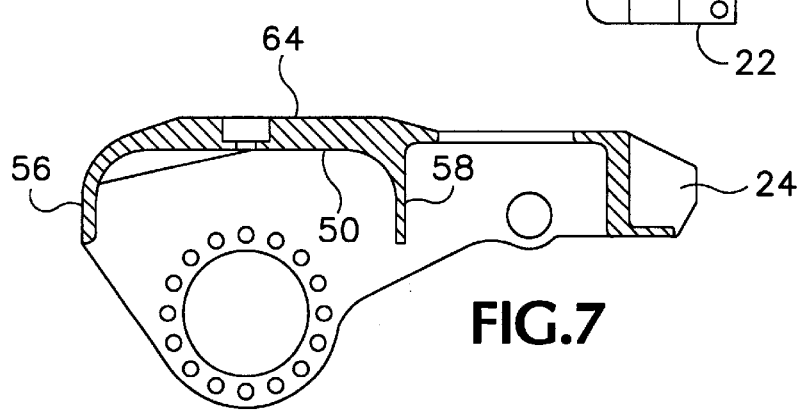
FIG. 7 is a sectional view of the trailing arm from the inboard side taken along line 7—7.

Referring to FIGS. 5, 6, and 7, the trailing arm 16 has a generally planar body 50. The outboard edge 54 of the training arm 16 is arranged substantially longitudinally of the vehicle. A peripheral wall 56 projects upward from the upper surface of the body 50 and extends substantially around the periphery of the body 50. The coupling elements 22 and 24 are along the forward edge 52 of the body which arranged is generally transversely to the vehicle. A mid wall 58, also projecting upward from the upper surface of the body 50, extends generally across the body 50 from the outboard edge 54 to the inboard edge 60. The mid wall 58 and the peripheral wall 56 enclose an air spring bearing area 62 of the planar body 50 against which the air spring 26 bears. The integral hub-type axle 14 is affixed by capscrews 34 to the peripheral wall 56 on the outboard edge 54 of the trailing arm 16. The axle 14 is cantilevered from the peripheral wall 56 and projects transversely to the longitudinal axis of the vehicle. The hub-type axle 14 includes a brake and a conventional wheel bearing arrangement for mounting the wheel 2.

The trailing arm 16 is attached to the vehicle frame at the laterally spaced apart inboard 22 and outboard 24 coupling elements on the peripheral wall 56 at the forward edge 52 of the body. Rolling resistance, braking and shock from striking obstructions impose forces in the plane of the wheel 2 resulting in horizontal forces and couples at the frame attachments 18 and 20. These forces are transferred to the frame attachments 18 and 20 by the peripheral wall 56 and the coupling elements 22 and 24. Restraint of lateral movement and tire scrubbing during turning produce lateral forces at the wheel 2. The results are lateral forces and additional horizontal couples at the frame attachments 18 and 20. On the other hand, the weight of the vehicle, as amplified by the dynamic forces by generated wheel motion when traveling over a rough surface, produces a couple in the vertical plane at the frame attachment points 18 and 20. The widely spaced inboard 18 and outboard 20 frame attachments of the trailing arm 16 of the present invention can resist the combination of forces and moments acting at the frame attachments 18 and 20 without the necessity of additional linkage to provide adequate lateral stability to the trailing arm.

The weight of the vehicle and the dynamic forces of wheel motion when traveling over a rough surface act at the longitudinal centerline of the cantilevered wheel 2 producing a couple tending to twist the trailing arm 16 about an axis parallel to the longitudinal axis of the vehicle. The peripheral wall 56 increases the polar moment of inertia of the trailing arm 16 strengthening the trailing arm 16 against the "twisting" moments and the forces that must be resisted by it. The mid wall 58 aids the internal distribution forces in the trailing arm 16. In addition, a thickened section 64 of the body 50 of the trailing arm under the inboard half of the air spring bearing surface 62, through the mid-section of the body 50 and along the inboard edge of the body to redistributes forces and reduce stresses in selected areas of the body 50. The thickened section 64 is disposed in an area substantially of the shape of the body 50 of the trailing arm 16 and is located on the inboard side of the body and, at least, partially occupies the spring bearing area 62. The peripheral wall 56 and mid wall 58 on the upper surface and the thickened section 64 of the planar body 50 strengthen the trailing arm 16 make practical the construction of the trailing arm 16 from a light weight material, such as aluminum, minimizing the unsprung mass of the trailing arm. Reducing the unsprung mass improves the responsiveness of the suspension providing improved tire contact when traveling over an uneven road surface. This reduces skidding and improves direction control of the vehicle. Reducing the unsprung mass also reduces the dynamic forces generated in the suspension system when traveling over uneven surfaces.

An air brake actuator 36 is attached to the peripheral wall 56 of the trailing arm 16 inboard of the spring 26 by a bracket 38 affixed to the inboard edge 60 of the trailing arm 16. The piston rod 39 of the actuator 36 is connected to a lever arm 33. The lever arm 33 is connected to a cross-shaft 37 which is journaled in the peripheral wall 56 of the trailing arm 16. A second lever 31 attached to the cross-shaft 37 is connected by a link 29 to the slack adjuster 27 of conventional, cam-actuated brake incorporated in the axle 14. When the piston rod 39 strokes in or out of the brake actuator 36 the lever arm 33 rotates the cross-shaft 37 which causes the slack adjuster 27 to rotate and an attached cam to apply or release the brake. Mounting the brake actuator 36 and brake actuation linkage on the trailing arm 16 below the floor of the vehicle makes the suspension system more compact. This permits tandem wheels to be placed closer together than would be possible if the brake actuator 36 were mounted between the wheels. Reducing the distance between wheels reduces the length of multi-wheel suspensions; reducing the force necessary to steer and control the vehicle. Placing the brake actuator 36 below the floor reduces the height of the fender over the wheels 2 when compared to suspensions having the brake actuator mounted above the wheels. This allows the load to overhang the wheel area more easily and maximizes the cargo volume.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

What is claimed is:

1. A suspension system on a vehicle comprising:
    (a) a trailing arm having a first end pivotally attachable to said vehicle at a pivot axis below a floor of said vehicle;
    (b) an axle affixed to said trailing arm at a first location spaced apart from said first end;
    (c) a ground engaging wheel supported on said axle for rotation about a center of rotation;
    (d) a spring having a first end vertically displaced below said center of rotation of said wheel and arranged for contact with said vehicle and a second end arranged to contact said trailing arm at a second location spaced apart from said first end, said spring urging said trailing arm to pivot away from said vehicle in opposition to a force exerted on said trailing arm by said axle;
    (e) a brake attached to said axle; and
    (f) a brake actuator, operatively connected to said brake, affixed to said trailing arm below said floor of said vehicle.

2. The suspension system of claim 1 wherein said brake actuator is affixed to said trailing arm at a position nearer to a longitudinal centerline of said vehicle than said second location.

3. The suspension system of claim 1 wherein said brake actuator is operatively connected to said brake by a linkage movably mounted on said trailing arm.

4. A trailing arm for a suspension system on a vehicle comprising:
    (a) a substantially planar body having a periphery, an upper surface, and further having;
        (1) an outboard peripheral edge extending substantially longitudinally of said vehicle;
        (2) a forward peripheral edge extending substantially transversely to said outboard peripheral edge; and
        (3) an inboard peripheral edge extending substantially longitudinally of said vehicle and spaced apart from said outboard peripheral edge; and
    (b) a generally upright peripheral wall extending substantially around said periphery;
    (c) a generally upright mid wall extending substantially from said peripheral wall at said outboard peripheral edge of said body to said peripheral wall at said inboard peripheral edge of said body and substantially enclosing, in conjunction with said peripheral wall, a spring bearing area on said upper surface of said body;
    (d) an axle cantilevered from said peripheral wall proximate to said outboard peripheral edge of said body, said axle arranged to support a vehicle wheel for rotation about a first axis substantially transverse to a longitudinal axis of said vehicle; and
    (e) a pivotal coupling at said forward peripheral edge arranged to engage said vehicle to permit rotation of said trailing arm about a second axis substantially transverse to said longitudinal axis of said vehicle but otherwise resisting motion of said trailing arm relative to said vehicle.

5. The trailing arm of claim 4 wherein said body is comprised principally of aluminum.

6. The trailing arm of claim 4 wherein said pivotal coupling comprises a first coupling element adjacent to said outboard edge of said trailing arm and a second coupling element spaced apart from said first coupling element toward the longitudinal centerline of said vehicle.

7. The trailing arm of claim 4 further comprising a thickened section of said body at least partially occupying said spring bearing area and being smaller than said body.

8. The trailing arm of claim 7 wherein said thickened section has peripheral edges extending substantially parallel to said peripheral edges of said body.

9. The trailing arm of claim 7 wherein said thickened section is closer to said inboard peripheral edge than said outboard peripheral edge of said body.

10. A trailing arm for a suspension system on a vehicle comprising:
    (a) a substantially planar body having a periphery, an upper surface, and further having;
        (1) an outboard peripheral edge extending substantially longitudinally of said vehicle;
        (2) a forward peripheral edge extending substantially transversely to said outboard peripheral edge; and
        (3) an inboard peripheral edge extending substantially longitudinally of said vehicle and spaced apart from said outboard peripheral edge; and
    (b) a generally upright peripheral wall extending substantially around said periphery;
    (c) a spring bearing area on said upper surface of said body, said spring bearing area being spaced apart from said forward peripheral edge;
    (d) a thickened section of said body at least partially occupying said spring bearing area, being smaller than said body, and being closer to said inboard peripheral edge than said outboard peripheral edge of said body;
    (e) an axle cantilevered from said peripheral wall from said outboard peripheral edge of said body, said axle arranged to support a vehicle wheel for rotation about a first axis substantially transverse to a longitudinal axis of said vehicle; and
    (f) a pivotal coupling at said forward peripheral edge arranged to engage said vehicle to permit rotation of said trailing arm about a second axis substantially transverse to said longitudinal axis of said vehicle but otherwise resisting motion of said trailing arm relative to said vehicle.

11. The trailing arm of claim 10 wherein said thickened section has peripheral edges extending substantially parallel to said peripheral edges of said body.

12. The trailing arm of claim 10 wherein said body is comprised principally of aluminum.

* * * * *